Aug. 22, 1944.     R. R. R. SARAZIN     2,356,435
VIBRATION DAMPER
Filed Aug. 24, 1942

Inventor:
RAOUL ROLAND RAYMOND SARAZIN
By Al Holcombe
Attorney.

Patented Aug. 22, 1944

2,356,435

UNITED STATES PATENT OFFICE 2,356,435

VIBRATION DAMPER

Raoul Roland Raymond Sarazin, Lyon, France; vested in the Alien Property Custodian Application August 24, 1942, Serial No. 455,908
In France May 6, 1942

5 Claims. (Cl. 74—574)

The present invention relates to vibration dampers of the centrifugal pendulum type, these apparatus essentially including pendular masses eccentrically suspended to a rotating body and adapted to start into oscillation under the effect of the vibration to be damped, in phase opposition therewith.

These pendular masses must, in order to have the maximum efficiency, be mounted in such manner as to be able to oscillate with the minimum of friction. For this purpose, I have already suggested to connect them with their rotating support through rolling devices and preferably through the medium of rolling bodies bearing, on the one hand, upon runways carried by the rotating support, and, on the other hand, upon runways carried by the pendular mass.

According to some embodiments of this arrangement, which have already been proposed by me, these rolling bodies are in the form of members, for instance of annular shape, including internal rolling surfaces, these members being subjected to tensile stresses under the effect of the centrifugal force and of the tangential accelerations to which the masses are subjected.

Such members have the disadvantage of being deformable, due to their very shape, unless they are made very heavy, which however is undesirable for functional reasons. Therefore, up to the present time, it had been preferred to make use of cylindrical rolling bodies having external rolling surfaces.

The chief object of the present invention is to provide an apparatus of the type above referred to including, for the rolling suspension of the pendular masses thereof, rolling bodies having internal rolling surfaces, which is better adapted to meet the requirements of practice, this result being obtained, in particular, due to the fact that the rolling bodies are both sufficiently rigid and of light construction.

According to an essential feature of the present invention, the apparatus includes, for connection of the pendular mass with the rotating support of said mass, at least one rolling body provided with internal rolling surfaces adapted to coact with two convex runways, one of which is carried by the pendular mass and the other by the rotating support and these rolling bodies are provided with bracing means opposing deformation of said body under the effect of the tensile stresses to which it is subjected in the course of its operation.

According to a preferred embodiment of my invention, the bracing means consist of a web extending symmetrically inside a rolling member of annular shape, the internal surface of said annular member coacting with runways provided on lugs extending on either side of said web.

Other features of the present invention will result from the following detailed description of some specific embodiments thereof.

A preferred embodiment of the present invention will be hereinafter described with reference to the accompanying drawing given merely by way of example and in which.

Figure 1:
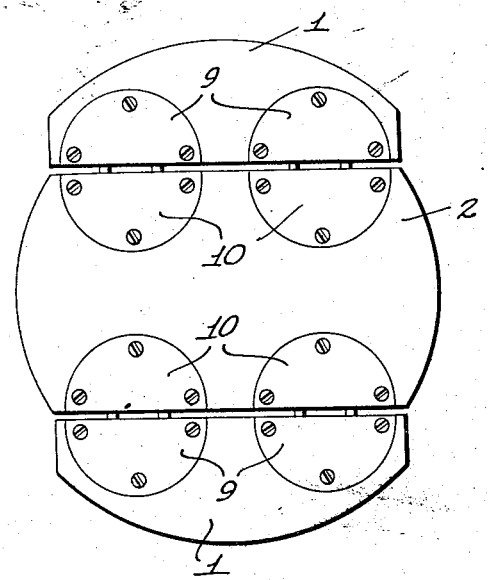
Fig. 1 is an end view of a torsion vibration damper made according to the present invention.
Figure 2:
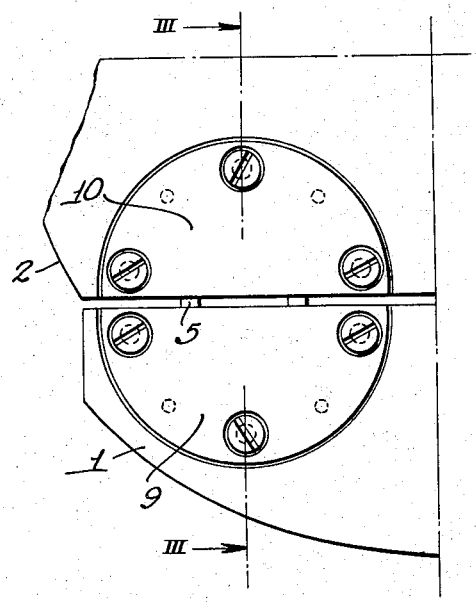
Fig. 2 is a part view on an enlarged scale corresponding to Fig. 1.
Figure 3:
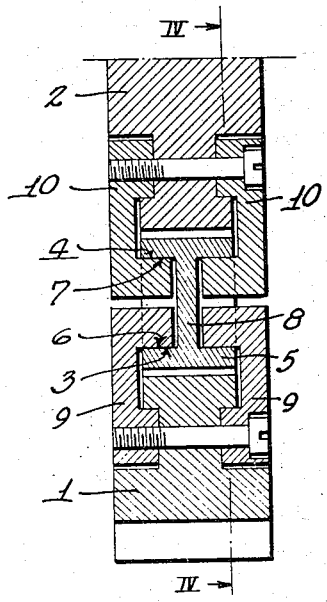
Fig. 3 is a sectional view on the line III—III of Fig. 2.
Figure 4:
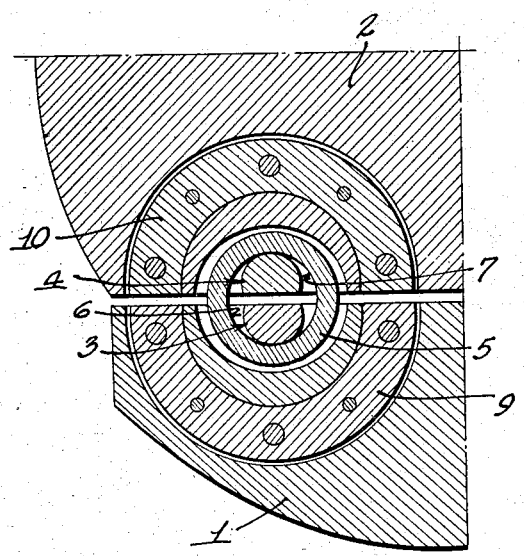
Fig. 4 is a sectional view on the line IV—IV of Fig. 3.

In the following description, it will be supposed that the invention is applied to a torsion vibration damper to be mounted on a rotating shaft.

This damper includes, in a known manner, two pendular masses 1, connected through a bifilar suspension, to a plate 2 carried by said shaft.

The particular suspension according to the present invention is made in the following manner:

Mass 1 is provided with two convex runways 3, identical to each other, preferably of the form of portions of cylindrical surfaces of a radius equal to $r_1$, the runways being arranged in such manner that, when the pendular mass 1 is in position with respect to plate 2, the runways have their convexity turned away from the axis of revolution of said plate 2.

Plate 2 is provided with two convex runways 4, located at the same distance from each other as runways 3, and which are given the form of portions of cylinders of a radius equal to $r_2$, and have their convexity turned toward the axis of revolution of plate 2.

Runways 3 and 4 are arranged in such manner that each runway 3 is located opposite a runway 4 respectively.

I provide, around each set of cooperating runways 3 and 4, a rolling body 5 including two internal rolling surfaces 6 and 7, preferably of cylindrical shape, and having respective radii equal to $r_3$ and $r_4$. These rolling surfaces are intended to coact with runways 3 and 4 so as to obtain the suspension with the desired pendular radius $r$.

Preferably $r_1$ and $r_2$ are chosen of the same value and also $r_3$ and $r_4$. In this case, the pendular radius $r$ is equal to 2 $(r_3-r_1)$.

If $r_3=r_4$, the rolling body 5 can be given the shape of a body of revolution.

In any case, according to my invention, this rolling body is provided with bracing means capable of opposing deformation of said body under the effect of the tensile stresses to which it is subjected in the course of operation.

Advantageously, these bracing means are constituted:

(a) Either by at least one reinforcing part carried by the rolling body and adapted to increase, at least in certain zones, the moment of inertia of its section;

(b) Or, preferably, by a web 8, for instance of solid structure, extending inside the annular member which constitutes the rolling body and perpendicular to the axis of said annular member.

This embodiment is that shown by the drawing.

In this example, each of the rolling surfaces 6 and 7 is preferably constituted by two portions in line with each other, located on either side of web 8, the whole of the rolling body being then symmetrical with respect to the medium plane of its web and having the shape of a disc provided with a cylindrical hole on each of its faces.

As for the runways 3 and 4, they are also divided into two halves, in line with each other and forming studs or lugs adapted to engage in said cylindrical holes respectively.

Advantageously, these lugs are carried by plates such as 9, 10 fixed respectively, for instance by means of bolts, on the one hand to plate 2 and on the other hand to mass 1, in such manner that the two lugs corresponding to a given runway are in line with each other and extend toward each other. For this purpose, it is advantageous to provide, between each of the plates 9, 10 and the element 1 or 2 which must support it, an engagement ensuring a correct positioning and fixation of the runways.

It will be readily understood that once the different elements have been assembled together, the rolling bodies 5 are mounted in housings closed laterally by plates 9 and 10 and that the pendular movement can then take place, provided of course that the desired plays have been provided between, on the one hand, the rolling body 5 and, on the other hand, masses 1 and plate 2.

Whatever be the particular embodiment that is chosen, I obtain a device the operation of which results sufficiently clearly from the preceding description for making it unnecessary to enter into further explanations.

This device has many advantages, the most important of which are the following:

The rolling body cannot be deformed, owing to the provision of web 8 which stiffens it;

The stresses applied to the rolling body by the runways are well distributed, in a symmetrical manner with respect to web 8;

The zone of contact between the lugs 6, 7 and the rolling body 5 is of maximum length, since this length can be equal to the total thickness of the apparatus, only decreased by the thickness of web 8 (for instance two or three millimeters) and by that of plates 9 and 10;

Finally, the rolling bodies are perfectly maintained in transverse position.

Of course, the arrangement above described has no limitative character and, for instance, the rolling bodies, instead of being constituted by annular bodies of revolution, might be formed by annular portions connected by a web or again by non-circular annular members.

In a general manner, while I have disclosed, in the above description, what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for damping vibrations of a rotating part which comprises, in combination, at least one pendular mass, two suspensions for bifilar pendular mounting of said mass on said part, each suspension including cylindrical runway means carried by said part having generatrices parallel to the rotation axis of said part, cylindrical runway means carried by said pendular mass opposite said first mentioned runway means, having generatrices parallel to said axis, a rolling body of general annular shape having an internal cylindrical wall in rolling contact with said first mentioned runway means and an internal cylindrical wall in rolling contact with said second mentioned runway means, and a bracing portion integral with said member and transverse to the cylindrical walls thereof, for resisting the stresses tending to deform said member outwardly.

2. A device for damping vibrations of a rotating part which comprises, in combination, at least one pendular mass, two suspensions for bifilar pendular mounting of said mass on said part, each suspension including two lateral lugs carried by said part and extending toward each other parallelly to the rotation axis of said part, the walls of said lugs that are turned toward said axis forming cylindrical runways having their generatrices parallel to said axis, two lateral lugs carried by said pendular mass opposite the two first mentioned lateral lugs and extending toward each other parallelly to the above mentioned axis, the walls of said second mentioned lugs that are turned away from said axis forming cylindrical runways having their generatrices parallel to said axis, a rolling body of general annular shape having an internal cylindrical wall in rolling contact with said first mentioned runways and an internal cylindrical wall in rolling contact with said second mentioned runways, and a bracing web integral with said member extending between the first mentioned lugs and between the second mentioned lugs, transversely to said cylindrical walls, for bracing said member against the stresses tending to deform said member outwardly.

3. A device for damping vibrations of a rotating part which comprises, in combination, at least one pendular mass, two suspensions for bifilar pendular mounting of said mass on said part, each suspension including two lateral lugs carried by said part and extending toward each other parallelly to the rotation axis of said part, the walls of said lugs that are turned toward said axis forming cylindrical runways having their generatrices parallel to said axis, two lateral lugs carried by said pendular mass oppostie the two first mentioned lateral lugs and extending toward each other parallelly to the above mentioned axis, the walls of said second mentioned lugs that are turned away from said axis forming cylindrical runways having their generatrices parallel to said axis, the two lugs of each of the two above mentioned pairs being symmetrical with respect to a plane perpendicular to said axis and common to both pairs, a rolling body of general annular shape having an internal cylindrical wall in rolling contact with said first mentioned runways and an internal cylindrical wall in rolling contact with said second mentioned runways, and a bracing web integral with said member extending along said plane of symmetry so as to pass between the first mentioned lugs and between the second mentioned lugs, transversely to said cylindrical walls, for bracing said member against the stresses tending to deform said member outwardly.

4. A device for damping vibrations of a rotating part which comprises, in combination, at least one pendular mass, two suspensions for bifilar pendular mounting of said means on said part, each suspension including two lateral lugs carried by said part and extending toward each other parallelly to the rotation axis of said part, the walls of said lugs that are turned toward said axis forming cylindrical runways of circular section having their generatrices parallel to said axis, two lateral lugs carried by said pendular mass opposite the two first mentioned lateral lugs and extending toward each other parallelly to the above mentioned axis, the walls of said second mentioned lugs that are turned away from said axis forming cylindrical runways of circular section having their generatrices parallel to said axis, the two lugs of each of the two above mentioned pairs being symmetrical with respect to a plane perpendicular to said axis and common to both pairs, a rolling body of general annular shape having an internal cylindrical wall in rolling contact with said first mentioned runways and an internal cylindrical wall in rolling contact with said second mentioned runways, and a bracing web integral with said member extending along said plane of symmetry so as to pass between the first mentioned lugs and between the second mentioned lugs, for bracing said member against the stresses tending to deform it outwardly, said member being symmetrical with respect to its web.

5. A device for damping vibrations of a rotating part which comprises, in combination, at least one pendular mass, two suspensions for bifilar pendular mounting of said member on said part, each suspension including two lateral lugs carried by said part and extending toward each other parallelly to the rotation axis of said part, the walls of said lugs that are turned toward said axis forming cylindrical runways of circular section having their generatrices parallel to said axis, two lateral lugs carried by said pendular mass opposite the two first mentioned lateral lugs and extending toward each other parallelly to the above mentioned axis, the walls of said second mentioned lugs that are turned away from said axis forming cylindrical runways of circular section and of the same radius having their generatrices parallel to said axis, the two lugs of each of the two above mentioned pairs being symmetrical with respect to a plane perpendicular to said axis and common to both pairs, a rolling body of circular annular shape having its inner circular cylindrical wall in rolling contact with the first mentioned runways and with the second mentioned runways, and a bracing web integral with said member extending along said plane of symmetry so as to pass between the first mentioned lugs and between the second mentioned lugs, for bracing said member against the stresses tending to deform it outwardly, said annular member being symmetrical with respect to its web.

RAOUL ROLAND RAYMOND SARAZIN.